US008611603B2

(12) United States Patent
Rosario

(10) Patent No.: US 8,611,603 B2
(45) Date of Patent: Dec. 17, 2013

(54) METHOD AND APPARATUS FOR OBJECT TRACKING VIA HYPERSPECTRAL IMAGERY

(75) Inventor: Dalton S. Rosario, Germantown, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 130 days.

(21) Appl. No.: 13/372,772

(22) Filed: Feb. 14, 2012

(65) Prior Publication Data

US 2013/0208944 A1    Aug. 15, 2013

(51) Int. Cl.
*G06K 9/00* (2006.01)
*H04N 5/225* (2006.01)

(52) U.S. Cl.
USPC .......................................... 382/103; 348/169

(58) Field of Classification Search
USPC ......... 382/103, 190, 191, 197, 209, 263, 274; 348/152, 169, 170, 171, 172, 352
See application file for complete search history.

(56) References Cited

U.S. PATENT DOCUMENTS

| | | | |
|---|---|---|---|
| 6,678,395 B2 | 1/2004 | Yonover et al. | |
| 6,778,702 B1 | 8/2004 | Sweet | |
| 6,940,999 B2 * | 9/2005 | Lin | 382/103 |
| 7,593,587 B1 * | 9/2009 | Rosario | 382/263 |
| 2007/0076955 A1 | 4/2007 | Schaum et al. | |

OTHER PUBLICATIONS

Dalton Rosario "Independent & Indirectly Generated Hyperspectral Attributes for Rare Signal Detection", U.S. Army Research Laboratory, 2800 Powder Mill Road, Adelphi, MD, 11 pages, no date.
A. Goetz, G. Vane, J. Solomon, and B. Rock, "Imaging Spectrometry for Earth Remote Sensing," Science, vol. 228. No. 4704, pp. 1147-1153, Jun. 1985.
Saurabh Prasad "Overcoming the Small Sample Size Problem in Hyperspectral Classification and Detection Tasks", Electrical and Computer Engineering Department and Georesources Institute, Mississippi State University, IEEE 2008. pp. 381-384.
D. Landgrebe, "Hyperspectral image Data Analysis," IEEE Signal Processing Magazine, vol. 19, No. 1, pp. 17-28, Jan. 2002.
G. Shaw and D Manotakis, "Signal Processing for Hyperspectral Image Exploitation," IEEE Signal Processing Magazine, vol. 19, No. 1, pp. 12-16, Jan. 2002.

(Continued)

*Primary Examiner* — Abolfazl Tabatabai
(74) *Attorney, Agent, or Firm* — Alan I. Kalb

(57) ABSTRACT

A computer-implemented method for tracking a small sample size user-identified object comprising extracting a plurality of blocks of pixels from a first frame of a plurality of frames of a scene detected by a hyperspectral (HS) sensor, comparing a reference sample of the object with the plurality of blocks to generate a first attribute set corresponding to contrasting HS response values of the reference sample and HS response values of each block of the plurality of blocks, comparing a test sample of a portion of the first frame to each block of the plurality of blocks to generate a second attribute set corresponding to contrasting HS response values of the test samples and HS response values of each block of the plurality of blocks and determining if the object exists in two or more of the frames by comparing the first HS attribute set with the second HS attribute set.

20 Claims, 4 Drawing Sheets

(56) References Cited

OTHER PUBLICATIONS

G. Healey and D Slater, "Models and Methods for Automated Material Identification in Hyperspectral Imagery Acquired Under Unknown Illumination and Atmospheric Conditions," IEEE Trans. Geoscience and Remote Sensing, vol. 37, pp. 2706-2717, Nov. 1999.

D.S.K. Chan, "A Unified Framework for IR Target Detection and Tracking," In Signal and Data Processing of Small Targets 1992. O. E. Drummond, Editor, Proceedings of SPIE vol. 1698, pp. 66-76, 1992.

C.E. Caefer, J. Silverman, and J.M. Mooney, "Optimization of Point Tracking Filters", IEEE Trans. on Aerospace and Electronic Systems, 36(1), pp. 15-25, 2000.

Duda, Richard O., Peter E. Hart, and David G. Stork, "Pattern Classification", John Wiley and Sons, New York, selected pp. 16-17, 541 and 568 (2001).

Marina V.A. Murzina, J. Paul Farrell, "Dynamic Hyperspectral Imaging", Brookhaven Technology Group, Setauket, NY, 10 pages, no date.

Varsano, L. Yatskaer, I., and Rotman, S. R., "Temporal Target Tracking in Hyperspectral Images," Optical Engineering, Ben-Gurion University of the Negev, Department of Electoral and Computer, Engineering, Beer-Shiva, 84105, Israel, Dec. 2006, 30 pages.

R. A. Schowengerdt. "Remote Sensing, Model and Methods for Image Processing", 2nd Ed. San Diego, CA: Academic Press, 1997, pp. 459-463.

Hammer, B. and T. Vilmann. "Generalized Relevance Learning Vector Quantization," Neural Networks. 15(1), 1059-1068 (2002).

Wallace M. Porter, Thomas G. Chrien, Earl G. Hansen, and Charles M. Sarture, "Evolution of the Airborne Visible/Infrared Imaging Spectrometer (AVIRIS) Flight and Ground Data Processing System", Jet Propulsion Laboratory, California Institute of Technology, Pasadena, California, SPIE vol. 1298 Imaging Spectroscopy of the Terrestrial Environment, 1690, 7 pages.

ITT ENVI homepage http://www.idl-envi.com Date accessed: Feb. 8, 2012.

Spectral Science Inc FLAASH http://www.spectral.com/remotesense.shtml#FLAASH Date accessed: Feb. 8, 2012.

S. M. Schweizer and J. M. F. Moura, "Hyperspectral Imagery: Clutter Adaptation in Anomaly Detection," IEEE Trans. Information Theory, Aug. 2000, 46, No. 5, pp. 1855-1871.

E. L. Lehmann, "Testing Statistical Hypotheses", New York: transferred to Chapman & Hall, 2nd Edition, 1993, pp. 209-213.

Harsanyi, J.C, Chang, C.-I, "Hyperspectral Image Classification and Dimensionality Reduction: An Orthogonal Subspace Projection Approach," IEEE Transactions on geoscience and remote sensing, vol. 32, pp. 779-785, Jul. 1994.

Yu-Chi Ho, Qian-Chuan Zhao, and David L. Pepyne, "The No Free Lunch Theorems: Complexity and Security", IEEE Transactions on Automatic Control, vol. 48, No. 5, May 2003, pp. 783-793.

R. A. Schowengerdt, "Remote sensing, Models and Methods for Image Process", 2nd Ed. San Diego, CA: Academic Press, 1997, selected pp. 459-463.

Oleg Kuybeda, David Malah and Meir Barzohar, "Rank Estimation and Redundancy Reduction of High-Dimensional Noisy Signals With Preservation of Rare Vectors", Transactions on Signal Processing, vol. 55, No. 12, Dec. 2007, pp. 5579-5592.

Roy L. Streit, Marcus L. Graham and Michael J. Walsh, "Tracking in Hyper-Spectral Data" Naval Undersea Warfare Center, Newport RI, pp. 852-859, ISIF 2002.

N. Acito, M. Diani and G. Corsini, "A New Algorithm for Robust Estimation of the Signal Subspace in Hyperspectral Images in the Presence of Rare Signal Components", IEEE Transactions on Geoscience and Remote Sensing, vol. 47, No. 11, Nov. 2009, pp. 3844-3856.

Jose M, Bioucas-Dias and José M. P. Nascimento, "Hyperspectral Subspace Identification", IEEE Transactions on Geoscience and Remote Sensing, vol. 46, No. 6, Aug. 2006, pp. 2435-2445.

Joshua Blackburn, Michael Mendenhall, Andrew Rice, Paul Shelnutt, Neil Soliman and Juan Vasquez, "Feature Aided Tracking with Hyperspectral Imagery", Air Force Institute of Technology, 2950 Hobson Way, WPAFB, OH, USA, Signal and Data Processing of Small Targets 2007, 12 pages.

\* cited by examiner

METHOD AND APPARATUS FOR OBJECT TRACKING VIA HYPERSPECTRAL IMAGERY

GOVERNMENT INTEREST

Governmental Interest—The invention described herein may be manufactured, used and licensed by or for the U.S. Government.

FIELD OF INVENTION

Embodiments of the present invention generally relate to tracking objects in imagery and, more particularly, to a method and apparatus for motion-invariant object tracking via hyperspectral imagery.

BACKGROUND OF THE INVENTION

Often, objects of interest, such as motor vehicles, persons or other entities are required to be tracked by remote sensing. Sensors are mounted on platforms surveying the entities which move relative to the sensor platforms enabling kinematic motion tracking, i.e., tracking based on the positional movement of the entities. The sensors create discrete images of a scene and the images are represented as a sequence of frames. In conventional kinematic approaches, entity motion is easily blocked by structures such as buildings, trees, tunnels and the like in a sensor's viewing area. Continuity of entity motion is lost across the sensed sequence of frames when an entity goes out of view of the sensor and one unique object is mistaken for two distinct objects when the entity comes back into view of the sensor.

For example, in a scenario where an aerial sensor is capturing frames of a motor vehicle travelling on a highway, kinematic tracking allows the vehicle to be tracked accurately until the vehicle becomes occluded, e.g., enters a tunnel. Once the vehicle emerges from the tunnel, the aerial sensor has no way of correlating the vehicle to the previous view of the same vehicle, and will therefore classify the vehicle exiting the tunnel as new entity. This problem is worsened if several vehicles are entering and emerging from the tunnel. The aerial camera effectively loses tracking for all vehicles when they enter and exit a tunnel, or vehicles are obstructed from view by any structure for a few frames. The loss of tracking across the sequence of frames results in incomplete tracking of entities, and important targets are lost. The loss of tracking the motion is more pronounced when a vehicle is obscured for long periods of time. For shorter periods of occlusion, a kinematic motion tracker may be able to compensate for small frame to frame losses, but for long periods of occlusion in a sequence of frames, the kinematic motion tracker is not able to correlate two seemingly distinct entities sensed at different periods of the tracking as being the same entity.

In order to surmount these difficulties imposed by kinematic motion tracking, hyperspectral (HS) based remote sensing is often used as a substitute technology. HS imaging collects and processes the wavelength of responses of incident surfaces being exposed to a plurality of regions of the electromagnetic spectrum. HS imaging divides the spectrum into many more bands than visible light. Vehicles, persons and other entities often leave a hyperspectral "fingerprint" known as spectral profiles or spectral signatures due to their paint material, clothing material and the like. Due to the number of HS bands, algorithms are available to identify nearly any material type. A sensor capable of HS imaging captures several frames of spectral profiles and compares the profiles in each frame to track an entity without relying on motion. For each frame, the HS sensor senses multiple HS bands per pixel, creating a three-dimensional HS data cube for processing and analysis. These cubes can be compared with cubes for other frames to perform tracking. In contrast to kinematic tracking, HS imaging can "pick up" tracks of an entity hours after the entity was initially obstructed and correlate the two tracks to one object.

However, often in HS sensing, entities are represented by only a few pixels out of the entire frame relative to the number of spectral bands sensed by the HS sensor, i.e., the entity has a "rare sample size" and thus is difficult to track because statistical methods have not proved reliable on rare sample sizes. For example, a vehicle is made of metallic red paint, but that paint appears in only seven pixels out of a five megapixel image. Conventional statistical hypothesis tests, which are used to perform HS tracking; cannot be implemented on such a small sample of pixels relative to the number of HS bands sensed.

Therefore, there is a need in the at for a method and apparatus for tracking entities of small sample size via hyperspectral imaging.

BRIEF SUMMARY OF THE INVENTION

Embodiments of the present invention relate to a computer-implemented method for tracking a small sample size user-identified object comprising extracting a plurality of blocks of pixels from a first frame of a plurality of frames of a scene detected by a hyperspectral (HS) sensor, comparing a reference sample of the object with the plurality of blocks to generate a first attribute set corresponding to contrasting HS response values of the reference sample and HS response values of each block of the plurality of blocks, comparing a test sample of a portion of the first frame to each block of the plurality of blocks to generate a second attribute set corresponding to contrasting HS response values of the test samples and HS response values of each block of the plurality of blocks and determining if the object exists in two or more of the frames by comparing the first HS attribute set with the second HS attribute set.

Another embodiment of the invention is directed to an apparatus comprising a selection module for extracting a plurality of blocks of pixels from a first frame of a plurality of frames of a scene detected by a hyperspectral (HS) sensor and a comparator module for comparing a reference sample of the object with the plurality of blocks to generate a first attribute set corresponding to contrasting HS response values of the reference sample and HS response values of each block of the plurality of blocks, comparing a test sample of a portion of the first frame to each block of the plurality of blocks to generate a second attribute set corresponding to contrasting HS response values of the test samples and HS response values of each block of the plurality of blocks and determining if the object exists in two or more of the frames by comparing the first HS attribute set with the second HS attribute set.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Embodiments of the present invention comprise a method and apparatus for tracking entities of small sample size via hyperspectral (HS) imaging. An HS sensor captures several spectral "image" frames of a scene over a period of time, capturing several HS band values for each pixel in the spectral image frame. An external user looks at a few of the frames and determines that a particular object is of interest and should be tracked by selecting the object on a display using a cursor, voice command, or the like. The identified object is known as the reference sample and is represented by its own set of hyperspectral profiles for all or some of the pixels in the object. A window, the same size as the reference sample (e.g., five pixels by seven pixels by two hundred HS bands), is established for iterating through every pixel of all subsequently sensed frames, where the window denotes a test sample represented by another set of hyperspectral profiles for each iteration for each sensed frame. Blocks of pixels (identical in size to the reference sample and test window, e.g., five pixels by seven pixels by two hundred HS bands) are extracted from the current frame randomly and the reference sample is compared to each block using a discriminant metric, i.e. a Spectral Angle Mapper (discussed below), which measures the angle difference between two vectors (in this case, two "mean" HS profiles), to generate a large sample, low dimensional attribute set. The blocks are randomly selected because randomness will provide the statistical independence required by a hypothesis test used in an embodiment of the present invention. The blocks are also compared to the test sample to generate a second large sample, low dimensional attribute set. These two attribute sets are then compared to determine if the entity represented by the reference sample is present in the window represented by the test sample. When this is repeated for all possible spatial locations in a current frame by positioning the window to test different pixels for each frame sensed by the HS sensor, an entity is trackable via its distinct large sample, low dimensional attribute set tied to the entity's hyperspectral profile.

Figure 1:
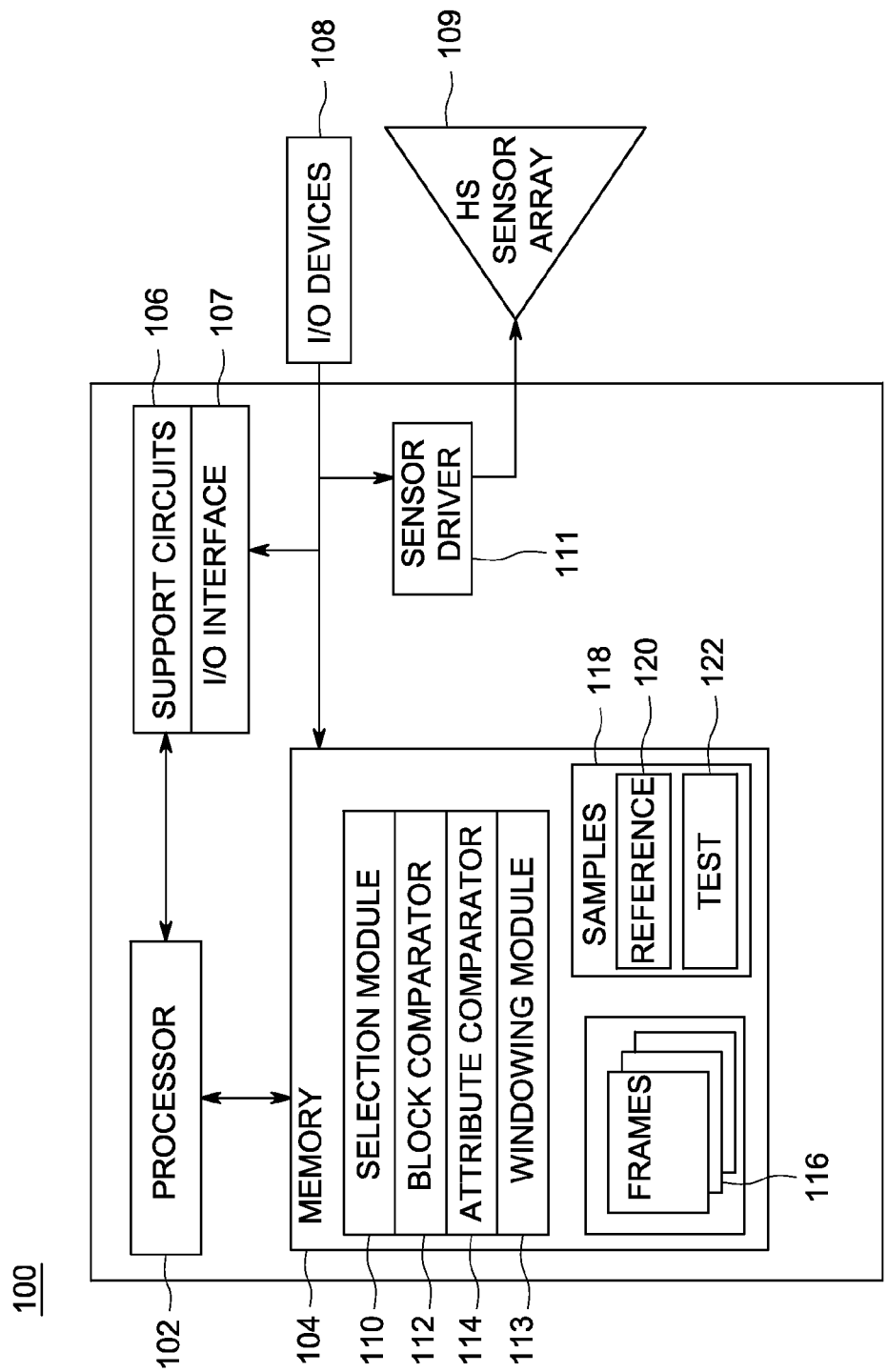
FIG. 1 is a block diagram depicting a computer system for tracking an object via hyperspectral imagery in accordance with exemplary embodiments of the present invention.

FIG. 1 is a block diagram depicting a computer system 100 for tracking an object via hyperspectral imagery in accordance with exemplary embodiments of the present invention. The computer system 100 includes a processor 102, a memory 104 and various support circuits 106. The processor 102 may include one or more microprocessors known in the art, and/or dedicated function processors such as field programmable gate arrays programmed to perform dedicated processing functions. The support circuits 106 for the processor 102 include microcontrollers, application specific integrated circuits (ASIC), cache, power supplies, clock circuits, data registers, I/O interface 107, and the like. The I/O interface 107 may be directly coupled to the memory 104 or coupled through the supporting circuits 106. The I/O interface 107 may also be configured for communication with input devices and/or output devices 108, such as, network devices, various storage devices, mouse, keyboard, displays, sensors and the like. An HS sensor array 109 is also coupled to the sensor driver 111, which is in turn coupled to the I/O interface 107.

The memory 104 stores non-transient processor-executable instructions and/or data that may be executed by and/or used by the processor 102. These processor-executable instructions may comprise firmware, software, and the like, or some combination thereof. Modules having processor-executable instructions that are stored in the memory 104 comprise the selection module 110, the block comparator 112, the windowing module 113, and the attribute comparator 114. Further, the memory 104 stores the frames 116 sensed by the sensor 109 and the samples 118 comprising the reference sample 120 and the test samples 122. In an exemplary embodiment, the memory 104 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

The selection module 110 extracts blocks of pixels from each frame in the plurality of sensed frames 116, where each pixel contains a plurality of hyperspectral responses. The blocks of pixels are selected randomly by selection module 110 to ensure statistical independence is achieved from the contrast between the comparison of blocks and the reference sample discussed below. The selection module 110 is configured to select a predetermined amount of blocks from each frame and is adjustable for effectiveness.

The block comparator 112 compares the reference sample 120 with the extracted blocks from frames 116, by comparing the hyperspectral responses to generate a contrast attribute set. The attribute set represents the difference between hyperspectral response values in the blocks and the reference sample. The windowing module 113 moves a small test window over the current frame of the plurality of sensed frames defining a test sample for each area in the frame and the block comparator 112 compares each test sample with the extracted blocks in the same manner to generate a second contrast attribute set. The attribute comparator 114 compares the output of the block comparator 112 for the reference sample with the output of the block comparator 112 for the test sample to determine whether these attribute sets matching, thereby indicating that the reference object exists in the current location of the test window.

Figure 2:
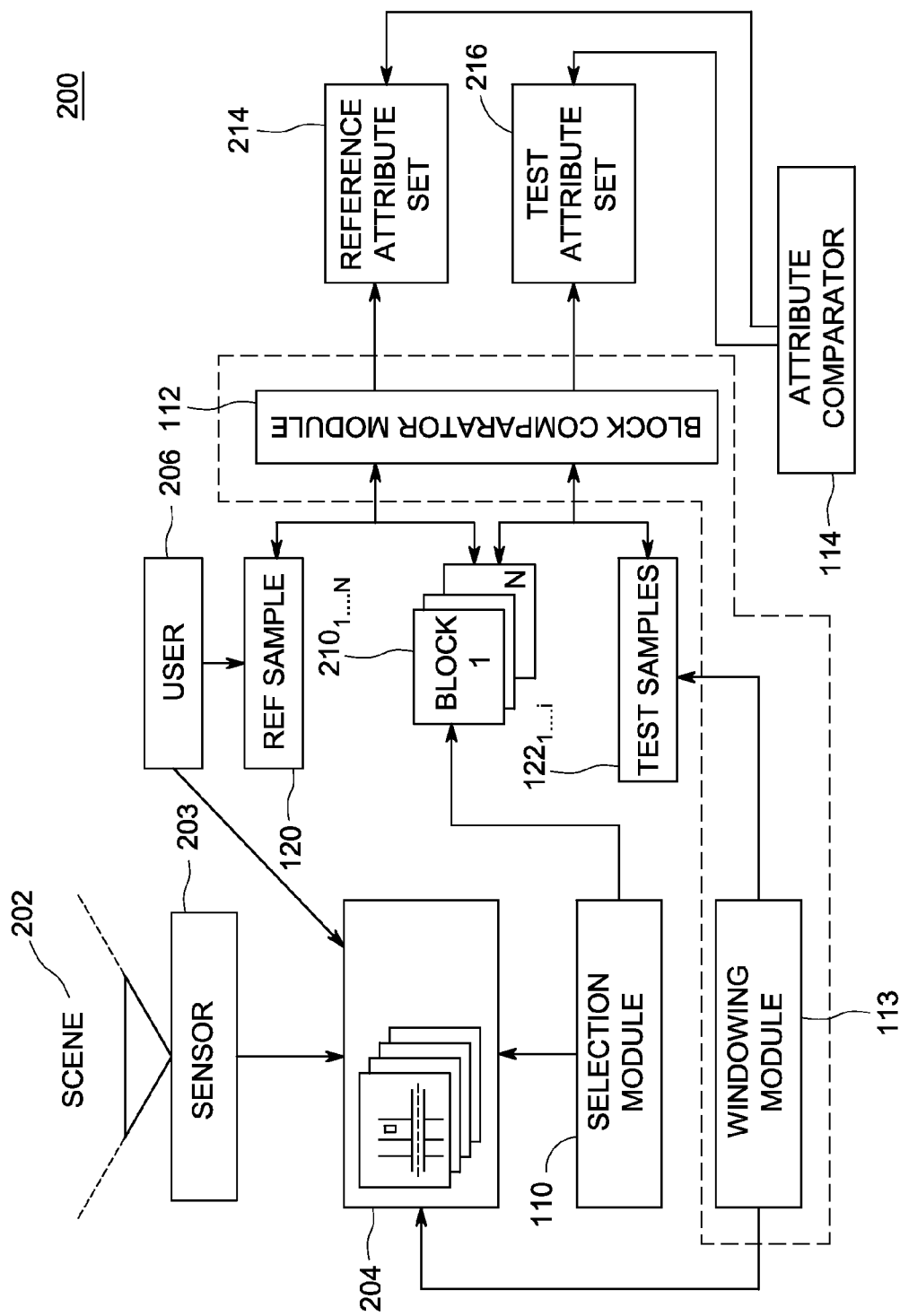
FIG. 2 is a functional diagram of the apparatus for tracking an object via hyperspectral imagery in accordance with an embodiment of the present invention.

FIG. 2 is a functional diagram of an apparatus 200 for tracking an object via hyperspectral imagery in accordance with an embodiment of the present invention. The sensor 203 captures the scene 202 in a plurality of frames 204, each having a vector of hyperspectral data bands B for each pixel in the frames. The sensor 203 functions similarly to a charge-coupled device (CCD) sensor except that instead of sensing visible light (Red/Green/Blue) responses, the sensor 203 records responses at different wavelengths of multiple regions of the electromagnetic spectrum such as the visible (V), near infrared (NIR), shortwave infrared (SWIR) and, if available, midwave infrared (MWIR) and longwave infrared (LWIR). In an exemplary embodiment, the sensor 203 operates in the Visible to NIR (VNIR) spectral range from 0.40 to 0.95 µm. Each pixel is a B-dimensional vector (where, for example, B=112) in which each component is represented as the spectral radiance at each wavelength, usually expressed in units of microwatts per square centimeter per nanometer per steradian. According to another exemplary embodiment, the sensor 203 is an array of HS sensors. The plurality of frames sensed by the sensor 203 are ordered according to one embodiment, but in other embodiments the frames need not be in temporal order. The selection module 110 extracts a predetermined number (N) of blocks $210_{1 \ldots N}$ from the frames 204 sensed by the sensor 203 on a frame by frame basis.

A user 206 observing the frames 204 selects an object of interest with n pixels in it from the chosen frame as a reference sample 120, where n is significantly smaller than B, the number of hyperspectral bands sensed by the sensor 203. The user 206 determines that this object may be of special interest and should be tracked across the frames 204. The user 206 can select this object using a simple mouse cursor, voice command for marking a portion of the frame, and the like. In other embodiments, the user 206 can highlight a portion of a frame using touch sensors to signify the object of interest. In yet another embodiment, the apparatus 200 is pre-configured by the user to automatically identify (using a pre-stored HS library) and track specific types of objects as the objects of interest. The dimension of the user selected reference sample is n×B, or the number of pixels used to represent an entity by the number of hyperspectral bands captured by the sensor 203. Note that this dimension should not be confused with the dimension of the data cube, as known to those of ordinary skill in the art of HS imaging, represented in this context only by B; n represents the number of spectra in the HS sample—or sample size—and B represents the dimension of the HS sample). The chosen number of blocks 210 is referred to as N and is predetermined or selected by the user 206 in an exemplary embodiment. The dimension of each of the blocks 210 is also n×B to ensure mathematical (linear algebra) compliance between the reference sample and the blocks.

The windowing module 113 generates multiple test samples $122_{1 \ldots i}$ by moving a window across the each location in the current frame from the frames 204. Once there is a selected reference sample 120, a set of blocks $210_{1 \ldots N}$, and a test sample $122_{1 \ldots i}$, the block comparator module 112 compares, iteratively, the reference sample 120 hyperspectral band values with the hyperspectral band values of the blocks $210_{1 \ldots N}$. During this process, the reference sample 120 is compared to each block $210_{1 \ldots N}$ where each comparison results in a contrast value and the entire set of contrast values is a reference attribute set 214 of dimensions N×m, where m is the number of decomposed regions of the spectrum available from the sensor 203 and is significantly smaller than N. In one embodiment, m=3 representing a decomposition among the regions V, NIR, and SWIR. In other embodiments the number of decomposed portions of the spectrums is selected by the user 206. An attribute set represents the compartmentalized contrasts between a HS sample [reference or test] and the random blocks of data, where compartmentalization is done according to the sensor's operating regions of the spectrum.

The block comparator 112 then compares the test sample $122_{1 \ldots i}$ hyperspectral band values with the hyperspectral band values of the blocks $210_{1 \ldots N}$. In an exemplary embodiment, N=200, although other configurations are possible. The comparison of the test samples $122_{1 \ldots i}$ with the blocks $210_{1 \ldots N}$ by the block comparator 112 will generate a test attribute set 216 of dimensions N×m (where N now also represents the number of contrasting attributes [a new sample size] and m now also represents the dimension of the attributes, where N is much greater than m), similar to the reference attribute set 214. Directly comparing the reference sample 120 sized n×B (where, for example, n is 14 and B is 112) with the test samples $212_{1 \ldots i}$ would not result in useful results as the number of pixels n is very low relative to B (dimension of the data), such that proper statistical measures cannot be determined to yield a reliable autonomous decision. For the tracking problem described, the use of Large Sample Theory is by far the most suitable to develop a hypothesis test, where a reliable autonomous decision can be made, but Large Sample Theory cannot be utilized with a low sample size such as n pixels. The sample size n is not only small but significantly smaller than B; ideally, for Large Sample Theory to be used, n must be an order of magnitude greater than B. With the above outlined flow, the reference attribute set and the test attribute set can be compared using Large Sample Theory because the problem is mapped from a small sample case (n much smaller in magnitude than dimension B) to a large sample case (N much greater in magnitude than dimension m). The attribute comparator 114 will compare the reference attribute set 214 and the test attribute set 216 to determine whether a particular test window location in the frames 204 contains the object represented by the reference sample 120 as selected by the user 206. The windowing module 113 then advances the window, by systematically moving the window by a pixel-length step within the current frame, to choose a new test sample within the current frame, and continues the comparison on a block by block basis until the windowing module 113 determines that the entire image frame has been processed, i.e., until each possible test sample within the current frame observed by the sliding window is compared to the randomly selected blocks $210_{1 \ldots N}$. In accordance with an exemplary embodiment of the present invention, the attribute sets 214 and 216 are discriminant object features, i.e., distinct contrast values indirectly representing the reference object 214 and contrast values indirectly representing the object currently observed by the sliding window 216, which can be exploited by a Large Sample Theory based hypothesis test (as N is much greater than m) to yield a reliable autonomous decision based on a known family of distributions controlling the hypothesis test's output results.

Figure 3:
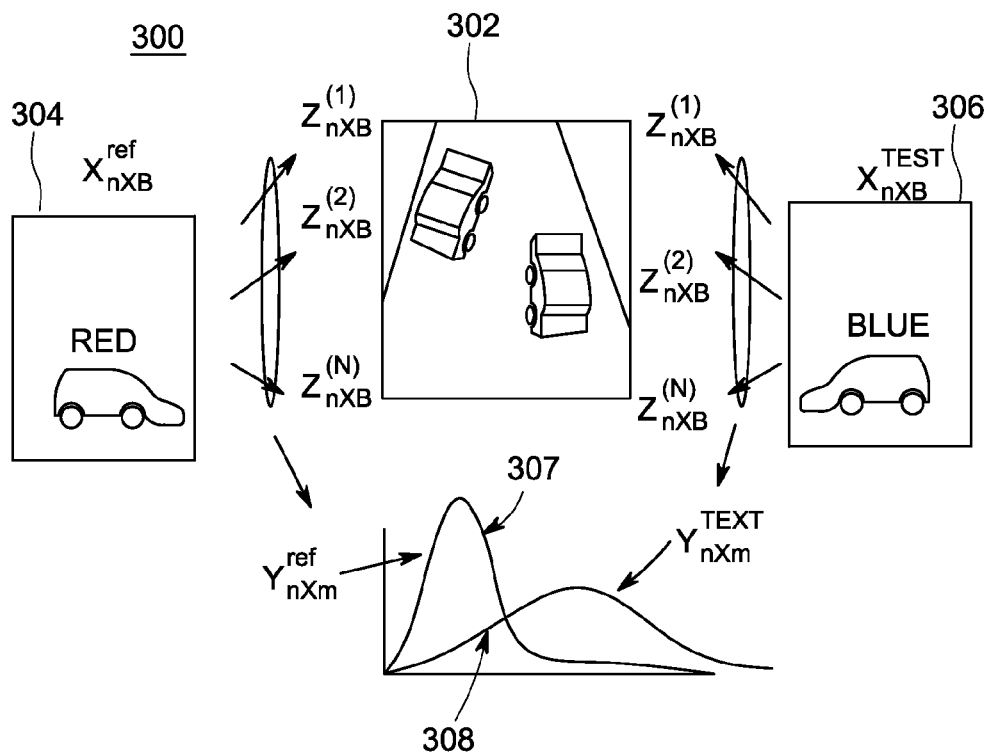
FIG. 3 is a conceptual representation of the comparison of two hyperspectral samples in accordance with an embodiment of the present invention.

FIG. 3 is a conceptual representation showing the comparison of two hyperspectral samples $X(ref)_{n \times B}$ (304) and $X(test)_{n \times B}$ (306). The HS samples represent a small block of data on the object of interest (reference sample 304) and a block of data being currently observed by a sliding window (test sample 306). The comparison is performed indirectly by first contrasting the reference sample $X_{n \times B}^{(reference)}$ against a series of randomly selected HS samples of the same size $Z_{n \times B}^{(1)}, \ldots, Z_{n \times B}^{(N)}$ (302), where N is a freely selectable parameter. This process yields a new attribute set $Y_{N \times m}^{(reference)}$ controlled by an unknown probability density function (PDF) (307) where N is much greater than m (N>>m) and m equals the number of decomposed regions of the spectrum available from the sensors (e.g., m=3 represents a decomposition among the visible, near-infrared and short-wave visible infrared regions). This process continues by contrasting the same series of random selections $Z_{n \times B}^{(1)}, \ldots, Z_{n \times B}^{(N)}$ against the test sample $X_{n \times B}^{(test)}$ in order to yield the corresponding new attribute $T_{N \times m}^{(test)}$ controlled by another unknown PDF (308) for testing. Finally, the means of the underlying multivariate distributions of $Y_{N \times m}^{(reference)}$ (307) and $Y_{N \times m}^{(test)}$ (308) are contrasted through a version of the Hotelling's $T^2$ test, as described in "*Testing Statistical Hypotheses*", New York, Lehmann. The Hotelling's $T^2$ test's output (or detector's output) is controlled by the F-distribution, as shown in "*Testing Statistical Hypotheses*", such that a decision criterion (e.g., probability of error for missing detecting the object of interest when it is currently observed by the sliding window) can be readily used to determine a cutoff or decision threshold for object detection/tracking. In an embodiment of this invention, the probability of missing the object of interest is used to determine the cutoff threshold for an autonomous decision. Using such a robust criterion for determining a decision threshold is only possible because the sample size N of the attribute sets is much larger than the attribute space dimension m, i.e., N>>m. Enabling such a capability via the present invention has a major impact in the described tracking problem using HS remote sensing technology.

The individual contrast between $X_{n\times B}^{(reference)}$ and the $k^{th}$ sample $Z_{n\times B}^{(k)}$ may not be unique, relative to the contrast between $Z_{n\times B}^{(k)}$ and some other sample (e.g., $X_{n\times B}^{(test)}$), but the object uniqueness, or distinctness, is achieved by collecting these contrasts between $X_{n\times B}^{(reference)}$ and each sample in the series $\{Z_{n\times B}^{(k)}\}_{k=1}^{N}$. In this context, the contrast is attained by computing mean averages of the available HS samples and applying a linear or non-linear metric between the resulting mean averages, where the new attribute set is finally generated for a particular entity by first capitalizing on the entity's sample original data space distinctness, using all of the bands (contrasts between spectral averages), and then on the fact that a sufficiently large number of contrasts will draw a better picture on the distinctness of the particular object in the new attribute space. The samples in the new attribute space ($Y_{N\times m}^{(reference)}$ or $Y_{N\times m}^{(test)}$) are statistically independent, since the contrasts are computed between a given HS sample ($X_{n\times B}^{(reference)}$ or $X_{n\times B}^{(test)}$) and a series $\{Z_{n\times B}^{(k)}\}_{k=1}^{N}$, of randomly selected blocks of data.

Given that an initial cue $X_{n\times B}^{(f)}$, a HS sample, is available as a reference set from image frame f, where n<<B, and another HS sample $X_{n\times B}^{(f+k)(r)}$ is also available as a testing set taken from another image, frame f+k, where r indexes a particular spatial location in frame f+k. These samples are rearranged as $$X_{n\times B}^{(f)} = [x_{01}^{(f)}, \ldots, x_{0n}^{(f)}]^t$$

$$X_{n\times B}^{(f+k)(r)} = [x_{11}^{(f+k)(r)}, \ldots, x_{1n}^{(f+k)(r)}]^t, \quad (1)$$

where $x_{ij}^{(f)} \in R^B$, $x_{ij}^{(f+k)(r)} \in R^B$, B is the number of frequency bands, i=(0,1), j=(1, . . . , n), and the operator $(\bullet)^t$ means transposed. $X_{n\times B}^{(f)}$ and $X_{n\times B}^{(f+k)(r)}$ must be transformed to a feature space where their representations, namely $Y_{N\times m}^{(f)}$ and $Y_{N\times m}^{(f+k)(r)}$, respectively, have a large sample size N relative to m number of components within any vector in the new space, i.e., (N>>m). The vectors within $T_{N\times m}^{(f)}$ should also be statistically independent, similarly for $Y_{N\times m}^{(f+k)(r)}$.

The independence requirement can be handled by autonomously and randomly selecting N blocks of data $Z_{n\times B}^{(f+k)(b)}$ (b=1, . . . , N) from frame f+k, such that the mean estimate using each available HS sample is decomposed into m distinct regions of the spectrum; and then applying a contrasting method, in this case the Spectral Angle Mapper (SAM) as described in "Hyperspectral imagery: clutter adaptation in anomaly detection," IEEE Trans. Information Theory, August 2000, 46, no. 5, pp. 1855-1871, S. M. Schweizer and J. M. F. Moura as a function of m. In mathematical language, this approach using $X_{n\times B}^{(f)}$ and $X_{n\times B}^{(f+k)(r)}$, separately, against $Z_{n\times B}^{(f+k)(b)}$ (b=1, . . . , N) yields $$Y_{N\times m}^{(f)} = \begin{bmatrix} y^{(f)(1)} \\ y^{(f)(1)} \\ \vdots \\ y^{(f)(N)} \end{bmatrix}, \quad (2)$$

where $y^{(f)(b)}$ b=1, . . . , N are attained for a given m (e.g., m=5), implying in this case that measurements are made using 5 regions of the spectrum, or $$y^{(f)(b)} = \begin{bmatrix} y_V^{(f)(b)} \\ y_{NIR}^{(f)(b)} \\ y_{SWIR}^{(f)(b)} \\ y_{MWIR}^{(f)(b)} \\ y_{LWIR} \end{bmatrix} \quad (3)$$

and $$Y_{N\times m}^{(f+k)(r)} = \begin{bmatrix} y^{(f+k)(r)(1)} \\ y^{(f+k)(r)(2)} \\ \vdots \\ y^{(f+k)(r)(N)} \end{bmatrix}, \quad (4)$$

where $y^{(f+k)(r)(b)}$, for m=5 and b=1, . . . , N, are $$y^{(f+k)(r)(b)} = \begin{bmatrix} y_V^{(f+k)(r)(b)} \\ y_{NIR}^{(f+k)(r)(b)} \\ y_{SWIR}^{(f+k)(r)(b)} \\ y_{MWIR}^{(f+k)(r)(b)} \\ y_{LWIR}^{(f+k)(r)(b)} \end{bmatrix}, \quad (5)$$

and, by suppressing most of the indexes for notational convenience, $$y_V^{(b)} = \arccos\left(\frac{\hat{\mu}_V^T \hat{\mu}_V^{(b)}}{\|\hat{\mu}_V\|\|\hat{\mu}_V^{(b)}\|}\right), \quad (6)$$

$$y_{NIR}^{(b)} = \arccos\left(\frac{\hat{\mu}_{NIR}^T \hat{\mu}_{NIR}^{(b)}}{\|\hat{\mu}_{NIR}\|\|\hat{\mu}_{NIR}^{(b)}\|}\right),$$

$$y_{SWIR}^{(b)} = \arccos\left(\frac{\hat{\mu}_{SWIR}^T \hat{\mu}_{SWIR}^{(b)}}{\|\hat{\mu}_{SWIR}\|\|\hat{\mu}_{SWIR}^{(b)}\|}\right),$$

$$y_{MWIR}^{(b)} = \arccos\left(\frac{\hat{\mu}_{MWIR}^T \hat{\mu}_{MWIR}^{(b)}}{\|\hat{\mu}_{MWIR}\|\|\hat{\mu}_{MWIR}^{(b)}\|}\right),$$

$$y_{LWIR}^{(b)} = \arccos\left(\frac{\hat{\mu}_V^T \hat{\mu}_V^{(b)}}{\|\hat{\mu}_{LWIR}\|\|\hat{\mu}_{LWIR}^{(b)}\|}\right),$$

where, $0 \leq y_V^{(b)} \leq \pi/2$, $0 \leq y_{NIR}^{(b)} \leq \pi/2$, $0 \leq y_{SWIR}^{(b)} \leq \pi/2$, $0 \leq y_{MWIR}^{(b)} \leq \pi/2$, and $0 \leq y_{LWIR}^{(b)} \leq \pi/2$ are components that will be averaged over N and included in $\hat{\mu}_X = [\hat{\mu}_V, \hat{\mu}_{NIR}, \hat{\mu}_{SWIR}, \hat{\mu}_{MWIR}, \hat{\mu}_{LWIR}]^t \in R^B$, $\hat{\mu}_Z^{(b)} = [\hat{\mu}_V^{(b)}, \hat{\mu}_{NIR}^{(b)}, \hat{\mu}_{SWIR}^{(b)}, \hat{\mu}_{MWIR}^{(b)}, \hat{\mu}_{LWIR}^{(b)}]^t \in R^B$, $\hat{\mu}_X$ is the mean average of $X_{n\times B}^{(f)}$ (or $X_{n\times B}^{(f+k)(r)}$, depending on whether (2) or (4) is being used), $\hat{\mu}_Z^{(b)}$ is the mean average of $Z_{n\times B}^{(f+k)(b)}$ (b=1, . . . , N), $\hat{\mu}_V \in R^{B_1}$, $\hat{\mu}_{NIR} \in R^{B_2}$, $\hat{\mu}_{SWIR} \in R^{B_3}$, $\hat{\mu}_{MWIR} \in R^{B_4}$, $\hat{\mu}_{LWIR} \in R^{B_5}$, $\hat{\mu}_V^{(b)} \in R^{B_1}$, $\hat{\mu}_{NIR}^{(b)} \epsilon R^{B_2}$, $\hat{\mu}_{SWIR}^{(b)} \epsilon R^{B_3}$, $\hat{\mu}_{MWIR}^{(b)} \epsilon R^{B_4}$, $\hat{\mu}_{LWIR}^{(b)} \epsilon R^{B_5}$, $B_1+B_2+B_3+B_4+B_5=B$, and $\|\cdot\|$ is the square root of the squared component sum.

By setting m=5, it is assumed that measurements are being made in all 5 regions of the spectrum. In exemplary embodiments m will likely be set to m=1 (MWIR or LWIR), m=2 (V and NIR), or m=3 (V, NIR, and SWIR). Notice in (6) that the mean averages of $X_{n\times B}^{(f)}$, $X_{n\times B}^{(f+k)(r)}$, and $Z_{n\times B(f+k)(b)}$ (b=1, . . . , N) are decomposed into the wavelengths that correspond to specific regions of the spectrum (e.g., V, NIR, SWIR). The sample size of $Z_{n\times B}^{(framei+k)(b)}$ does not necessarily need to be equal to n, since results are reduced as shown in (6) by contrasting $X_{n\times B}^{(f)}$ and $X_{n\times B}^{(f+k)(r)}$, separately, against each $Z_{n\times B}^{(framei+k)(b)}$. Finally, in equations (2) and (4) that the sample size N can be freely set to be significantly larger than m. Equipped with a large sample size statistical problem, a strong hypothesis test can now be utilized to function as a binary classifier, as shown next.

Using (2) and (4), let $$\Delta_{N\times m}^{(f,f+k)(r)} = Y_{N\times m}^{(f)} - Y_{N\times m}^{(f+k)(r)} \quad (7)$$

$$= \begin{bmatrix} \Delta_{1\times m}^{(f,f+k)(r)(1)} \\ \Delta_{1\times m}^{(f,f+k)(r)(2)} \\ \vdots \\ \Delta_{1\times m}^{(f,f+k)(r)(N)} \end{bmatrix}$$

be the difference (a contrast) between (2) and (4) over the SAM decomposed into the distinct regions of the spectrum, where $$\Delta_{1\times m}^{(f,f+k)(r)(b)} = y_{1\times m}^{(f)(b)} - y_{1\times m}^{(f+k)(r)(b)} (b=1, \ldots, N) \quad (8)$$

Using (7) as input to compute corresponding mean average and covariance estimates yields $$\overline{\Delta}_{1\times m}^{(f,f+k)(r)} = N^{-1}\Sigma_{b=1}^{N}\Delta_{1\times m}^{(f,f+k)(r)(b)} \quad (9) \text{ and}$$

$$\Sigma_{m\times m}^{(f,f+k)(r)} = (N-1)^{-1}(\Delta_{N\times m}^{(f,f+k)(r)} - \overline{\Delta}_{1\times m}^{(f,f+k)(r)})^t(\Delta_{N\times m}^{(f,f+k)(r)} - \overline{\Delta}_{1\times m}^{(f,f+k)(r)}). \quad (10)$$

Equation (9) represents a normalized sum of independent random variables, where one can utilize a $\alpha$-level test of $H_0:\delta_{1\times m}=0_{1\times m}$ versus $H_1:\delta_{1\times m}\neq 0_{1\times m}$, rejecting $H_0$ if the observed $$T^{2(f,f+k)(r)} = N(\overline{\Delta}_{1\times m}^{(f,f+k)(r)} - \delta_{1\times m})(\Sigma_{m\times m}^{(f,f+k)(r)})^{-1}(\overline{\Delta}_{1\times m}^{(f,f+k)(r)} - \delta_{1\times m})^t > \quad (11)$$

$$\frac{(N-1)m}{N-m}F_{m,N-m}(\alpha),$$

where $F_{m,N-m}(\alpha)$ is the upper (100$\alpha$)th percentile of an F-distribution with m and N-m degree of freedom. Equation (11) tests whether the average difference $\overline{\Delta}_{1\times m}^{(f,f+k)(r)}$ is statically close to a zero vector $0_{1\times m}$ of the same size. The test can be repeated across the testing imagery by using (2) and (4) and changing spatial index r=1, . . . , R. This will produce a 2 dimensional output surface. The overarching process can again be repeated using $X_{n\times B}^{(f)}$ as reference and a different image frame for testing.

Figure 4:
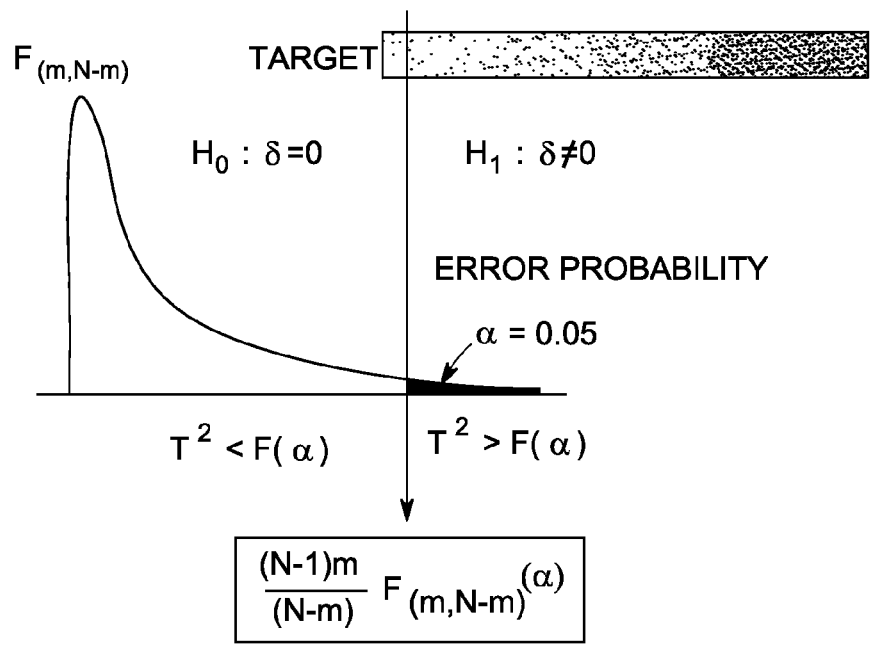
FIG. 4 is an illustration of the output of a statistical comparison in accordance with an embodiment of the present invention.

FIG. 4 depicts the decision output of (11) according to an embodiment of the present invention. In FIG. 4, the error probability $\alpha$ (or probability of missing detecting the object of interest) is arbitrarily set to $\alpha$=0.05 (a 5% of chance of missing the object of interest). Test HS samples observed by the slide window producing values of (11) lesser than the cutoff threshold $$\frac{(N-1)m}{N-m}F_{m,N-m}(\alpha)$$

are declared as the correct material composing the object of interest based on the comparison with the reference HS sample (embedded in (11)); the detection of the object of interest is autonomously declared in the current frame. The correct detection of the object of interest in temporal dependent frame sequences is equivalent to, and hence considered here as, object tracking; although in this case motion features are not used.

Figure 5:
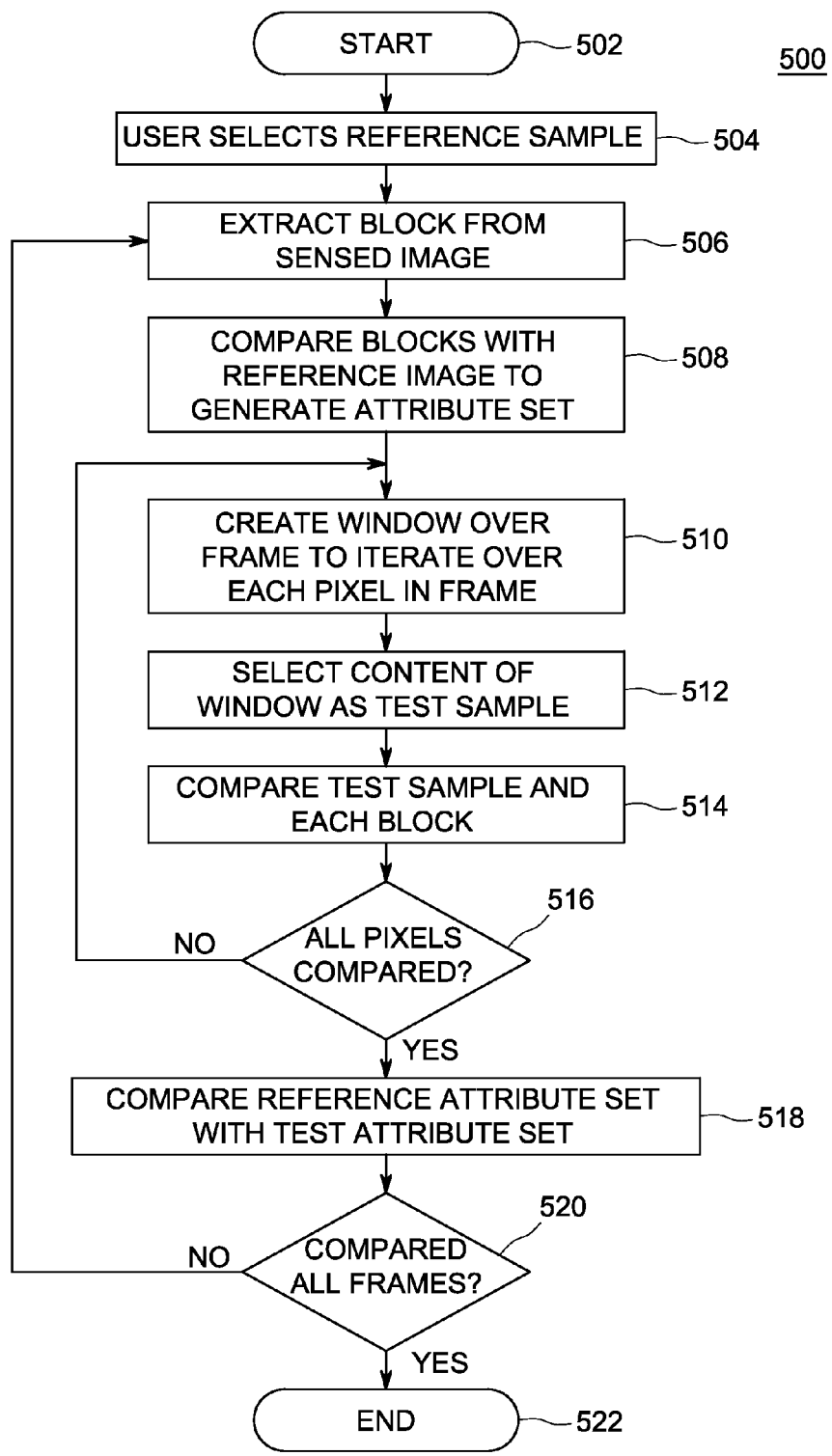
FIG. 5 is a flow diagram of a method for tracking an object via hyperspectral imagery in accordance with an embodiment of the present invention.

FIG. 5 is a flow diagram of a method 500 for tracking an object via hyperspectral imagery in accordance with an embodiment of the present invention. The method 500 is an implementation of the apparatus 200 as interpreted by the computer apparatus 100 and executed by the processor 102. The method begins at step 502 and proceeds to step 504.

At step 504 a reference sample is selected by a user viewing the received frame from the sensor 203 of FIG. 2. The user identifies an object of interest by viewing several images from a sensor and concluding that a particular vehicle, object, person, or the like, should be tracked across multiple frames captured by sensor 203. The user selects the object of interest as a reference sample, which has the same dimensions as each block in the sensed frame. In exemplary embodiments, the user selection is performed using a mouse cursor over an image frame, voice command, touch sensor, or the like. The method then proceeds to step 506, where a predetermined number (N) of blocks are extracted from a frame sensed by the hyperspectral sensor 203 of FIG. 2. The blocks are selected at random, where each pixel within each block has a vector of hyperspectral values for each hyperspectral band that sensor 203 detects. In step 508, the reference sample is compared to each of the N blocks extracted from the current frame. The comparison is a contrast between the HS sample mean of the reference sample and the HS sample mean of each randomly selected block of data, generating a contrast-value for the reference sample against each block and, therefore, an attribute set consisting of N contrast values. As the contrasting task is compartmentalized by the sensor's operational regions of the spectrum (e.g., m=2 for V, NIR), the comparison results in a low dimensional (m), having a large sample size (N), reference attribute set.

The method proceeds to step 510 where a window with the same dimensions as the reference sample is established over the current frame. The window iterates over the entire sensed frame so that every pixel (allowing overlap of the sliding window) is covered, such that, during each iteration, the window highlights a test sample. At step 512, the content of the window is selected as a test sample. At step 514, the test sample is also compared to each of the same N blocks of the current frame to generate a test attribute set of the same dimensions (m) and sample size (N) as the reference attribute set. From top to bottom and left to right, the test starts by taking a cue (a reference sample $X_{n\times B}^{(1)}$) from frame 1 (FIG. 3, element 302) of the target, where (using the notation in Section 3) n=6, B=112. The Independent and Indirectly Generated Attributes (IIGA) method, as described earlier, is first applied to the same frame (i.e. f=1, k=0), fixing m=2 (V,NIR), where N=200 (two orders of magnitude above m) blocks of data are autonomously and randomly selected $Z_{n\times B}^{(1)(b)}$ (b=1, . . . , N). All of the spatial locations in frame 1 [r=1, . . . , R, for R=(320)(256)−n] are tested, i.e., $X_{n\times B}^{(1)(r)}|_{r=1}^{R}$ against $X_{n\times B}^{(1)}$, indirectly, through contrasts against $Z_{n\times B}^{(1)(b)}$ (b=1, . . . , N) in order to generate a 2 dimensional output surface using (11). The testing process is repeated for successive frames, using the initially cued target sample $X_{n \times B}^{(1)}$ as the reference sample, and keeping all of the other parameters constant, in order to generate two additional output surfaces from those frames. As an example, $X_{n \times B}^{(3)(r)}|_{r=1}^{R}$ was tested against $X_{n \times B}^{(1)}$, indirectly, through contrasts against $Z_{n \times B}^{(3)(b)}$ (b=1, ..., N). The output surfaces' pixel values are the output $T^2$, as shown in (11), and the interpretation of $T^2$ relative to the hypotheses $H_0$ and $H_1$ and the pseudo color used to display the output surfaces is shown in FIG. 4, for a probability of error $\alpha=0.05$, N=200, and m=2, where the cluster of white pixels in a given output surface represent the likely spatial location in the frame where the object of interest is detected.

The method then proceeds to step 516 to determine whether all pixels in the current frame have been compared against all N blocks. If all pixels in the frame have not been compared, the method returns to step 510 and iterates the window. If all pixels have been compared, the test attribute set has been fully populated and the method moves to step 518. At step 518, the test attribute set is compared to the reference attribute set, where there comparison using equation (11), described above, results in a contrast value. If the contrast value is lower than a cutoff threshold as shown in FIG. 4, the test and reference samples are automatically determined to be a match. At step 520, if all frames sensed by the sensor 203 of FIG. 2 have not been compared, then the method returns to step 506 to compare the same reference sample with test samples from the next frame. If all frames have been compared, the method ends at step 522.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in associated with their respective functions. These elements, devices, modules and circuits are considered means for performing their respective functions as described herein. While the foregoing is directed to embodiments of the present invention, other and further embodiments of the invention may be devised without departing from the basic scope, thereof, and the scope thereof is determined by the claims that follow.

The invention claimed is:

1. A computer-implemented method for tracking a small sample size user-identified object comprising:
   extracting a plurality of blocks of pixels from a first frame of a plurality of frames of a scene detected by a hyperspectral (HS) sensor;
   comparing a reference sample of the object with the plurality of blocks to generate a first attribute set corresponding to contrasting HS response values of the reference sample and HS response values of each block of the plurality of blocks;
   comparing a test sample of a portion of the first frame to each block of the plurality of blocks to generate a second attribute set corresponding to contrasting HS response values of the test samples and HS response values of each block of the plurality of blocks; and
   determining if the object exists in two or more of the frames by comparing the first HS attribute set with the second HS attribute set.

2. The method of claim 1 wherein the extracting a plurality of blocks is randomly chosen from each frame of the plurality of frames such that the extracted blocks are spatially independent.

3. The method of claim 2 wherein each block of the plurality of blocks, the reference sample and the test sample have the same dimensions.

4. The method of claim 3 wherein the dimensions are the number of pixels by the number of hyperspectral bands detected by the sensor.

5. The method of claim 3 wherein the first and second attribute set have the same dimensions wherein the dimensions are the number of blocks in the plurality of blocks by a number of division of the sensor's operational regions of the spectrum.

6. The method of claim 1 wherein the comparing of the first attribute set with the second attribute determines if the object and the test sample correspond is based on a Large Sample Theory based hypothesis test.

7. The method of claim 1 wherein the number of pixels comprising each of the blocks of the plurality of blocks is significantly smaller than the number of hyperspectral bands detected by the sensor.

8. The method of claim 1 wherein the comparing steps compare the first set of attributes and the second set of attributes to track the object in the scene.

9. The method of claim 1 wherein the reference and test attribute sets have dimensions of the number of the plurality of blocks by the number of decompositions of different regions of the spectrum available in the sensor, wherein the spectrum is comprised of visible, near infrared, shortwave infrared, midwave infrared, and longwave infrared.

10. The method of claim 1 wherein the comparing comprises performing a hotelling test.

11. The apparatus of claim 1 wherein the comparator module performs a hotelling test for the comparing.

12. An apparatus comprising:
    a selection module for extracting a plurality of blocks of pixels from a first frame of a plurality of frames of a scene detected by a hyperspectral (HS) sensor; and
    a comparator module for:
    comparing a reference sample of the object with the plurality of blocks to generate a first attribute set corresponding to contrasting HS response values of the reference sample and HS response values of each block of the plurality of blocks;
    comparing a test sample of a portion of the first frame to each block of the plurality of blocks to generate a second attribute set corresponding to contrasting HS response values of the test samples and HS response values of each block of the plurality of blocks; and
    determining if the object exists in two or more of the frames by comparing the first attribute set with the second attribute set.

13. The apparatus of claim 12 wherein the extracting a plurality of blocks is randomly chosen from each frame of the plurality of frames such that the extracted blocks are spatially independent.

14. The apparatus of claim 13 wherein each block of the plurality of blocks, the reference sample and the test sample have the same dimensions.

15. The apparatus of claim 14 wherein the dimensions are the number of pixels by the number of hyperspectral bands detected by the sensor.

16. The apparatus of claim 14 wherein the first and second attribute set have the same dimensions wherein the dimensions are the number of blocks in the plurality of blocks by a number of division of the hyperspectral band.

17. The apparatus of claim 12 wherein the comparing the first attribute set with the second attribute determines if the object of interest and the test sample correspond is based on a strong hypothesis test.

18. The apparatus of claim 17 wherein the number of pixels comprising each of the blocks of the plurality of blocks is significantly smaller than the number of hyperspectral bands detected by the sensor.

19. The apparatus of claim 12 wherein the comparator module compares the first set of attributes and the second set of attributes to track the object in the scene.

20. The apparatus of claim 12 wherein the dimensions of the reference and test attribute set is the number of the plurality of blocks by the number of decompositions of a spectrum available in the sensor, wherein the spectrum is comprised of visible, near infrared, shortwave infrared, midwave infrared, and longwave infrared.

\* \* \* \* \*